United States Patent [19]
Goble

[11] Patent Number: 5,340,188
[45] Date of Patent: Aug. 23, 1994

[54] TRUCK ATTACHMENT

[76] Inventor: Rowland H. Goble, P.O. Box 423, Lake Mary, Fla. 32795-0423

[21] Appl. No.: 836,881

[22] Filed: Feb. 19, 1992

[51] Int. Cl.$^5$ .............................................. B60P 7/02
[52] U.S. Cl. ...................................... 296/100; 296/163
[58] Field of Search ...................... 296/100, 163, 105; 16/262, 4

[56] References Cited

U.S. PATENT DOCUMENTS

| | | | |
|---|---|---|---|
| 2,985,118 | 5/1961 | Maharick et al. | 296/100 |
| 3,012,814 | 12/1961 | Penner | 296/100 |
| 3,762,762 | 10/1973 | Beveridge | 296/100 |
| 4,033,011 | 7/1977 | Endo et al. | 16/4 X |
| 4,342,480 | 8/1982 | Ross, Jr. | 296/105 X |
| 4,413,855 | 11/1983 | Flanagan | 296/162 |
| 4,669,563 | 6/1987 | Kerney | 16/262 X |
| 4,824,163 | 4/1989 | Hendrych | 296/100 |
| 5,102,185 | 4/1992 | Lake | 296/100 X |

FOREIGN PATENT DOCUMENTS 629557  10/1961  Canada ................ 296/100

OTHER PUBLICATIONS

Automotive Industries, Aug. 1, 1953, p. 52 "Trailer Coach Industry Becomes of Age".

*Primary Examiner*—Dennis H. Pedder
*Attorney, Agent, or Firm*—William M. Hobby, III

[57] ABSTRACT

A pickup truck attachment apparatus is provided for a pickup truck having a cab and a cargo space truck bed with a pair of sidewalls and an end wall and a tailgate. The attachment includes a rigid cover for the pickup truck bed shaped to fit over the sidewalls with the rigid cover having a frame supporting a flat panel member attached thereto and having a top and bottom and two sides and two ends. Hinges having quick attaching-/detaching hinge pins has one hinge leaf attached to the truck bed end wall and the other hinge leaf attached to one end of the rigid cover and adapted for the rigid cover to rotate on the plurality of hinges so that the rigid panel can be raised and lowered from the tailgate end and can be quickly removed from the truck. Accessory attachment members are attached to the rigid cover panel for attaching accessories, such as a cover or the like so that the rigid cover can support attachments thereto. The rigid cover can be rapidly removed from the truck and supported on another surface, such as a boat or can form the floor for a trailer.

10 Claims, 2 Drawing Sheets

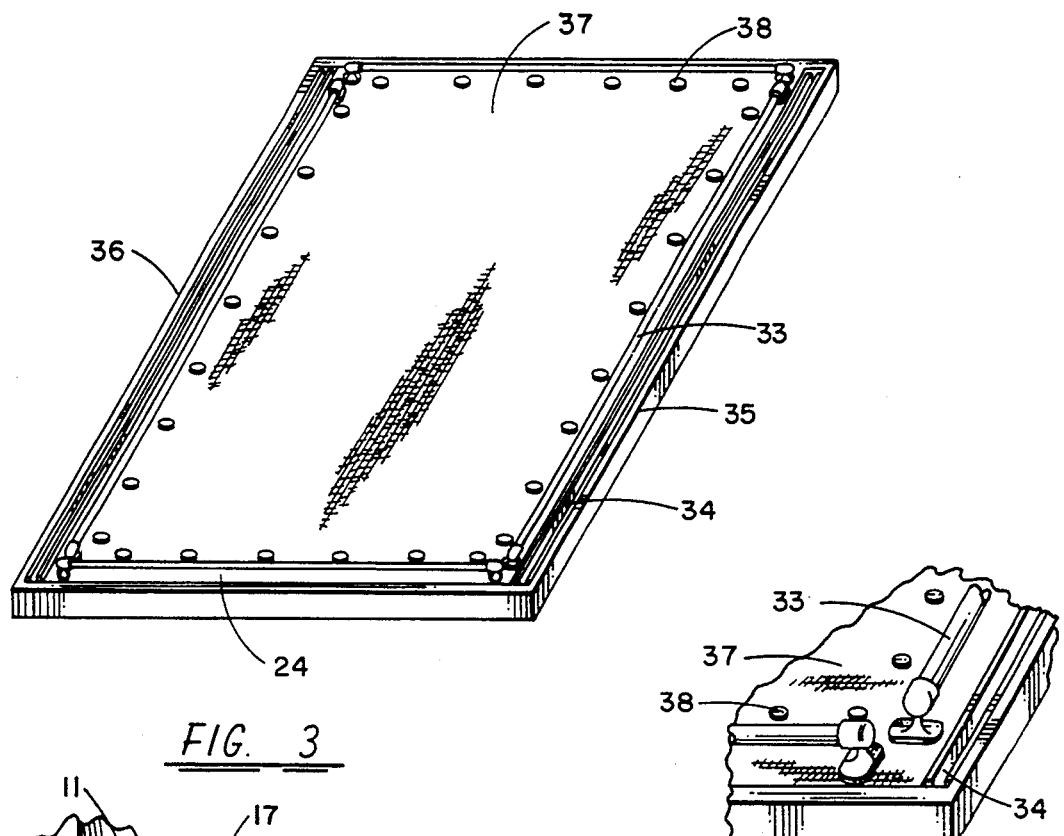
FIG. 3
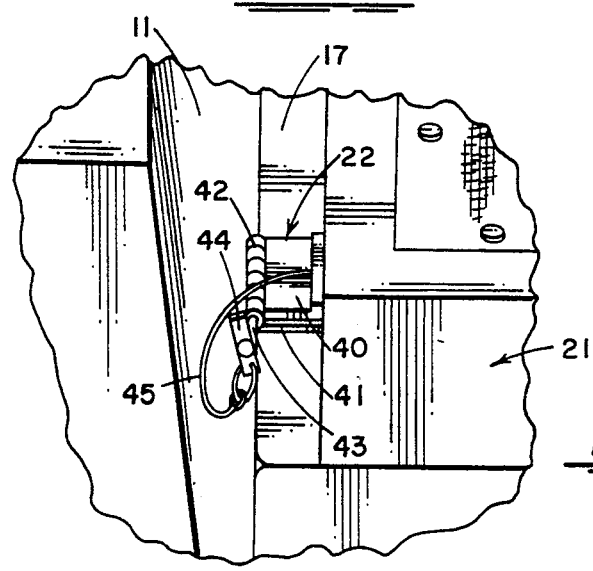
FIG. 4
FIG. 5
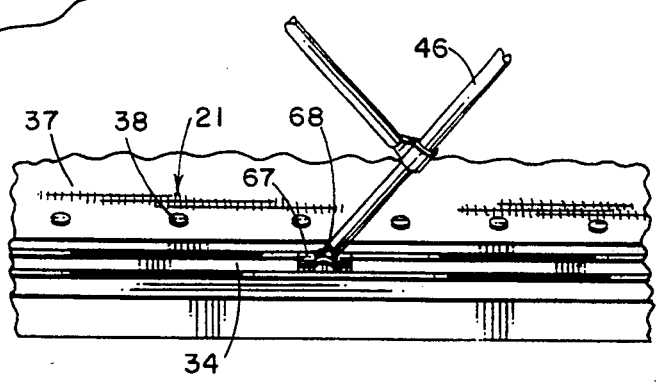
FIG. 8

TRUCK ATTACHMENT

BACKGROUND OF THE INVENTION

The present invention relates to a pickup truck attachment and especially to a multiuse rigid platform which acts as a cover for the cargo space of the pickup truck but is readily detachable for other uses.

In the past, it has been common to provide pickup trucks with a wide variety of attachments for fitting into the cargo space. A common attachment is for tool boxes which are mounted in the cargo space and attached to the sides of the cargo space. There have also been a variety of dog boxes for attaching in pickup trucks as well as various types of camping bodies including covers for the cargo space or truck bed and there have been folding canopies and tent structures as well as camper bodies attachable to the cargo space of the truck.

In my prior U.S. Pat. No. 5,018,778 for a Pickup Truck Attachment Apparatus, I provided a truck attachment which allows a pickup truck to be used for carrying a dog box, a camping enclosure, and mounting seats on the back of the truck. In addition, the attachment provided for storage space and a foldable tent structure which could be mounted to the top thereof.

Typical prior art patents which show collapsible canopies or tent structures for pickup truck cargo space can also be seen in the Feather U.S. Pat. No. 3,688,787 for a longitudinal collapsible canopy for pickup trucks and analogous frames and in the Westmoreland U.S. Pat. No. 2,436,736 for a collapsible canopy frame for a pickup truck and in the Rodrigue U.S. Pat. No. 4,252,363 for a foldaway canopy for a flatbed truck. Also in U.S. Pat. No. 4,310,914 to Billet for a tent camper for a pickup truck and in the Bouregois U.S. Pat. No. 4,289,346 for a collapsible protective mechanism for a pickup truck and in the Cook U.S. Pat. No. 2,670,988 for a folding pickup truck top. These patents typically have a flexible canopy or tent covering material and a plurality of frame members which can be set up or folded to support the canopy to enclose all or part of the cargo space of a pickup truck.

In the Knaack et al. U.S. Pat. No. 4,573,731, a vehicle storage drawer unit attaches to the bottom of a pickup truck cargo space to define a storage drawer which can still carry a load on top of the drawer. In the LeVee U.S. Pat. No. 4,685,695, a watertight, secured truck enclosure is provided in the pickup truck cargo space and the Musgrove et al. U.S. Pat. No. 4,216,990 is a waterproof truck bed cover. The Ogilvie U.S. Pat. No. 3,245,713 is for a pickup truck body construction and the Beals U.S. Pat. No. 4,531,775 is a load bearing security cover for a pickup truck.

In contrast to the prior art, patents for a pickup truck cargo space tarps and covers, the present invention provides for a rigid supporting platform and cover hingedly mounted to the pickup truck which is rapidly detachable and which converts to an attachment for a boat or for the floor of a tent structure which also has supports for supporting the rigid cover and platform in different raised positions.

SUMMARY OF THE INVENTION

A pickup truck attachment apparatus is provided for a pickup truck having a cab and a cargo space or truck bed with a pair of sidewalls and an end wall and a tailgate. The attachment includes a rigid cover for the pickup truck bed shaped to fit over the sidewalls with the rigid cover having a frame supporting a flat panel member attached thereto and having a top and bottom and two sides and two ends. Hinges having quick attaching/detaching hinge pins have one hinge leaf attached to the truck bed end wall and the other hinge leaf attached to one end of the rigid cover and adapted for the rigid cover to rotate on the plurality of hinges so that the rigid panel can be raised and lowered from the tailgate end and can be quickly removed from the truck. Pneumatic cylinder support members are attached between the truck and the rigid cover for holding the rigid cover in a raised position lifted on the hinges to a position above the truck sidewalls. A latch is provided for latching the rigid cover in the lowered position to the tailgate to provide a rigid surface covering the truck bed. Accessory attachment members are attached to the rigid cover panel for attaching accessories, such as a cover or the like so that the rigid cover can support attachments thereto. The rigid cover can be rapidly removed from the truck and supported on another surface, such as a boat or can form the floor for a trailer.

BRIEF DESCRIPTION OF THE DRAWINGS

Other objects, features, and advantages of the present invention will be apparent from the written description and the drawings in which:

FIG. 3 is a perspective view of a rigid platform in accordance with the present invention;

FIG. 4 is a perspective cutaway of one corner of the platform of FIG. 3 on an enlarged scale;

FIG. 5 is a cutaway perspective of the second corner of the platform showing one of the quick release hinges;

FIG. 8 is a cutaway perspective of a section of the rigid platform having an awning support riding in a track.

DESCRIPTION OF THE PREFERRED EMBODIMENTS

Figure 1:
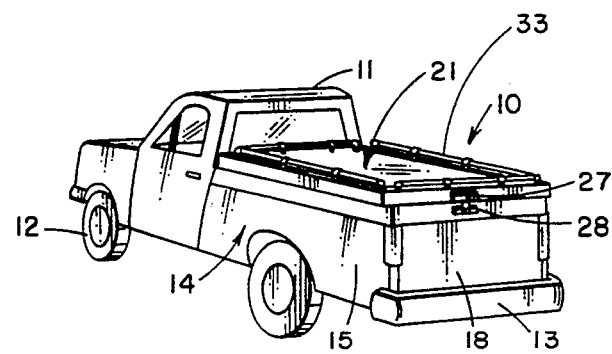
FIG. 1 is a perspective view of a pickup truck having a rigid platform cover in accordance with the present invention.
Figure 2:
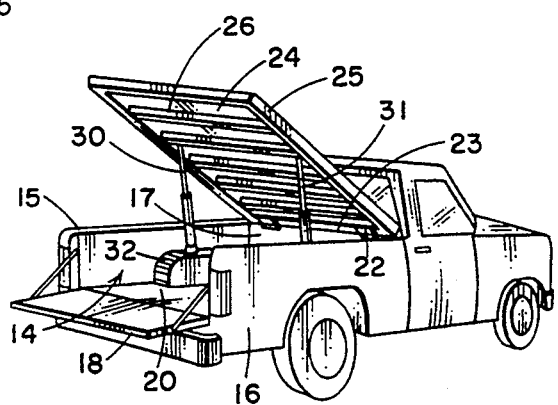
FIG. 2 is a perspective view of a pickup truck in accordance with FIG. 1 having the rigid platform in a raised position.

Referring to the drawings and especially to FIGS. 1 and 2, a pickup truck 10 has a cab 11 with tires and wheels 12, a rear bumper 13 with a truck bed or cargo space 14 having a pair of cargo space sidewalls 15 and 16 and a cab sidewall 17. The tailgate 18 is hinged to drop down, as shown in FIG. 2. The cargo space 14 has a bed 20. The pickup truck 10 has a rigid cover or platform attachment 21 mounted thereto with a pair of hinges 22 attached between the front or cab sidewalls 17 on one end 23 of the platform 21. Platform 21 has a solid planar panel 24, such as a piece of plywood, which has a periphery frame 25 attached around the edges and a plurality of cross frame members 26 forming a rigid frame with a flat plywood panel 24 attached thereto to form a rigid structure hinged with the hinges 22 to the pickup truck 10. The platform 21 has a platform locking member 27 on the end thereof adjacent the tailgate 18 which coordinates with a latching member 28 on the tailgate to latch the cover 21 to the tailgate 18 when it is in its lowered position, as shown in FIG. 1. A pair of pneumatic cylinders 30 and 31 are mounted to the tire wells 32 in the cargo space 14 on one end and are mounted to the frame members 26 on the other end thereof. The pneumatic cylinders 30 and 31 will support the platform 21 when raised on the hinges 22, as shown in FIG. 2, and hold the platform in place but will allow it to be pulled down and latched to the latch with the latch members 27 and 28. Rails 33 are attached around the periphery of the panel 24 for use in tieing items to the top of the platform. A pair of tracks 34 are mounted along the sides 35 and 36 of the platform, as shown in FIGS. 3 and 8, for attaching supporting rods for an awning or the like, as shown in FIGS. 6 and 7.

In FIG. 3, a carpet or cloth covering 37 extends over the platform panel 24 and has a plurality of metal snap fasteners 38 attached thereto for snapping to snap fasteners attached to the panel 24 so that the carpet covering 37 can be rapidly removed from the platform and replaced as desired. The track 34 can be more clearly seen in FIG. 4 as can the rails 33, snap members 38, and the cloth 37.

In FIG. 5, the platform 21 can be seen attached to the cargo sidewall 17 with the hinge 22 which hinge can be seen as having a hinge leaf member 40 attached to the platform 21 and a hinge leaf member 41 attached to the truck cargo wall 17 with the hinge leaf members 40 and 41 forming the barrel 42 of the hinge having a quick removably hinge (or pivot) pin 43 which can be snapped in and out by grasping the handle 44 of the hinge pin. The hinge pin handle 44 has a lanyard 45 attached thereto and to the hinge so that the hinge pin will always stay with the platform 21 when disconnecting the rapid disconnect hinges 22 and moving the platform to another surface.

Figure 6:
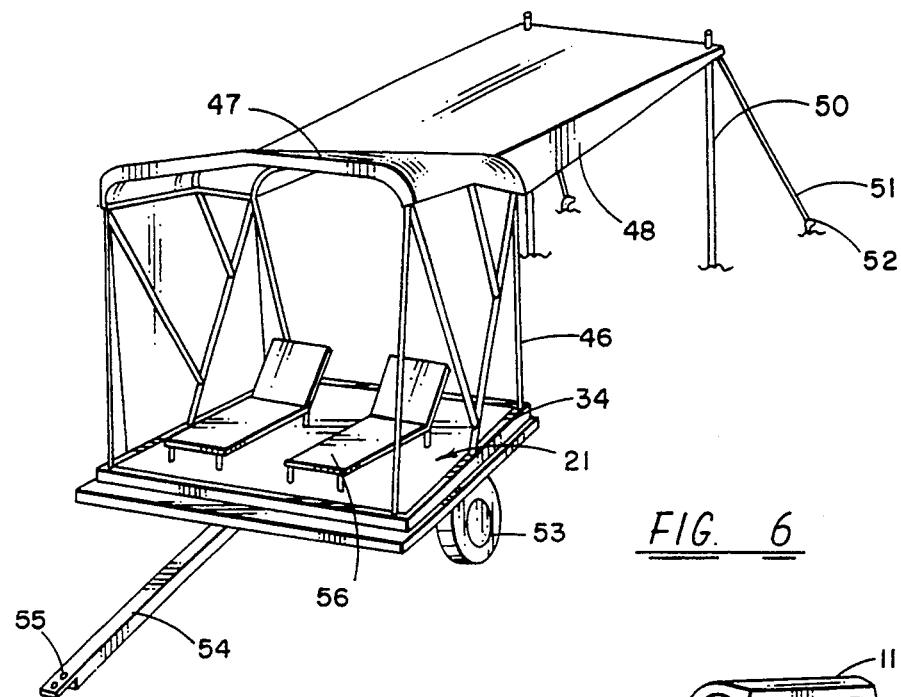
FIG. 6 is a perspective view of the platform attached to a trailer with a canopy attached thereto.
Figure 7:
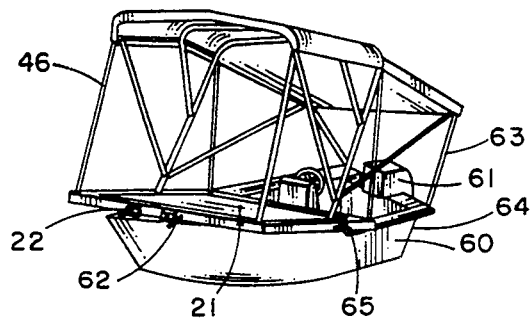
FIG. 7 is a perspective view of a boat having the rigid platform attached thereto and the canopy supports supported thereon.

In FIG. 6, the platform 21 has a plurality of awning support member 46 sliding in the track 34 of the panel 21 and in a raised position having the awning top 47 attached to the frame members 46 and having an extension tarp 48 attached thereto and supported at the opposite end on a pair of ground supporting poles 50 held with support cords 51 attached to earth anchors 52. Platform 21 can be seen in FIG. 6 as mounted to separate wheels and axle assembly 53 and has a towing tongue 54 attached thereto with a coupling 55 on the front thereof so that the platform is set up to operate as a small trailer. A pair of lounge chairs 56 are positioned on the platform with the tongue 54 leaning forward to support platform 21 from the front end in a level position.

In FIG. 7, the platform 21 has been mounted to a boat 60 with hinges 22. The boat has an outboard motor 61 attached thereto and rapidly connect to the boat 60 bow 62 with the hinges 22. The awning support members 46 are mounted in the tracks and interconnect with additional awning support members 63 mounted to the transom 64 of the boat 60. The platform 21 can also be attached with additional fasteners 65 to the sides of the boat 60, if desired.

FIG. 8 shows the platform 21 having the indoor/outdoor carpet 37 attached thereto with the snap fasteners 38 and having the track 34 attached to the side thereof and having the awning support members 46 having an awning support slide 67 sliding in the track 34 and having a hinged connection 68 connecting to the awning support member 46.

As can be seen, the present invention is a multiuse platform which is rapidly attached to a pickup truck 10 to exactly cover the cargo space fitting over the sidewalls 15 and 16 and over the top of the tailgate 18 and hinged to the front wall 17. When the platform 21 is in a lowered position, it is latched and can be locked to the tailgate 18 for the safe storage of items within the cargo space while providing a platform for attaching awnings over the truck and for tieing down cargo thereto. However, the platform, advantageously, can be unlatched from the tailgate 18 and raised, as shown in FIG. 2, to provide ready access and utilization of the space within the cargo space. The multipurpose platform can then be rapidly disconnected by pulling the hinge pins 43 from between the hinge leafs, disconnecting the pneumatic cylinders 30 and 31 and removing the lightweight rigid platform 21 which can then be placed on the earth for the floor of a tent or can be converted to a trailer using the axle and wheel assembly 53 and trailer tongue 54 and can convert an outboard boat, as shown in FIG. 7, to one with a platform surface having a full awning over the boat. However, the present invention is not to be construed as limited to the forms shown which are to be considered illustrative rather than restrictive.

I claim:

1. A pickup truck attachment for a pickup truck having a cab and a truck bed having a pair of sidewalls and an endwall and a tailgate comprising:
   a rigid covering platform for said pickup truck bed shaped to fit over the sidewalls thereof and having a frame supporting a flat panel member attached thereto and having a top and bottom and two sides and two ends;
   a plurality of hinges attached to the truck bed endwall and removably attached to said one end of said rigid covering platform and adapted for said rigid cover to rotate on said hinge whereby said rigid covering platform can have the other end thereof raised and lowered and can be disconnected and removed from said pickup truck, each said hinge being a quick removing hinge pin connecting a pair of hinge leafs and each hinge pin having a handle on one end thereof for removing and replacing said hinge pin;
   at least one support member for supporting said rigid covering platform other end in a raised position lifted on said hinge to a position above said pickup truck sidewalls;
   a plurality of fastener portions attached to said rigid covering platform and a flexible covering attached over said rigid covering platform and to said fastener portions;
   latch means for latching said rigid covering platform in a lowered generally horizontal position; and
   at least one attachment member attached to said rigid covering platform for attaching accessories to said rigid covering platform whereby a rigid covering platform covers a pickup truck bed and supports attachments thereto over the truck bed and is easily removed from the truck and supported on another surface.

2. A pickup truck attachment for a pickup truck in accordance with claim 1 in which said rigid covering platform frame is a peripheral frame attached to said flat panel member.

3. A pickup truck attachment for a pickup truck in accordance with claim 2 in which said rigid covering platform has a plurality of frame members connected to said peripheral frame and also attached to said flat panel.

4. A pickup truck attachment for a pickup truck in accordance with claim 3 in which said at least one hinge includes a plurality of hinges removably attaching said rigid covering platform to said pickup truck.

5. A pickup truck attachment for a pickup truck in accordance with claim 4 in which each of said plurality of hinge pins has a lanyard connected thereto and to said rigid covering platform so that said hinge pin always remains with said covering platform.

6. A pickup truck attachment for a pickup truck in accordance with claim 5 in which said rigid covering platform covering panel has a plurality of tracks mounted thereto for attaching awning support members for raising and lowering a awning over said platform.

7. A pickup truck attachment for a pickup truck in accordance with claim 6 in which said rigid covering platform covering panel flexible covering is a flexible carpeting.

8. A pickup truck attachment for a pickup truck in accordance with claim 7 in which said at least one support member includes two support members for supporting said rigid covering platform other end in a raised position.

9. A pickup truck attachment for a pickup truck in accordance with claim 8 in which each of said two support members is a pneumatic cylinder.

10. A pickup truck attachment for a pickup truck in accordance with claim 9 in which said attachment member includes a railing connected around the periphery of said rigid platform panel.

* * * * *